United States Patent
Voelker et al.

(10) Patent No.: US 6,758,485 B1
(45) Date of Patent: Jul. 6, 2004

(54) RETRACTABLE HITCH

(75) Inventors: Thomas P. Voelker, Davison, MI (US); Herb P. Brannon, Lapeer, MI (US); Duane M. Fitnich, Owosso, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/364,170

(22) Filed: Feb. 11, 2003

(51) Int. Cl.$^7$ .............................................. B60D 1/155
(52) U.S. Cl. .............................. 280/491.2; 280/479.2; 280/491.1
(58) Field of Search ........................ 280/478.1, 479.2, 280/479.3, 491.1, 491.2, 408, 482

(56) References Cited

U.S. PATENT DOCUMENTS

| | | | |
|---|---|---|---|
| 2,255,525 A | * 9/1941 | Kline et al. ................. 280/408 |
| 2,612,384 A | * 9/1952 | Wiegman ................. 280/491.2 |
| 2,914,343 A | * 11/1959 | Roth ....................... 280/491.2 |
| 3,738,683 A | 6/1973 | Tate ........................ 280/478 R |
| 4,482,167 A | 11/1984 | Haugrud ................. 280/491 B |
| 4,863,179 A | * 9/1989 | Isaacs ..................... 280/33.996 |
| 5,067,742 A | 11/1991 | Relja ....................... 280/479.2 |
| 5,322,315 A | 6/1994 | Carsten ................... 280/479.2 |
| 5,727,805 A | 3/1998 | La Roque ............... 280/478.1 |
| 5,845,921 A | 12/1998 | Stimac .................... 280/479.3 |
| 5,860,671 A | 1/1999 | Mackeown ............... 280/511 |
| 6,102,422 A | 8/2000 | Damron .................... 280/477 |
| 6,170,852 B1 | * 1/2001 | Kimbrough .............. 280/479.2 |
| 6,186,532 B1 | 2/2001 | Ray et al. ................. 280/508 |
| 6,224,084 B1 | 5/2001 | Ray et al. ................. 280/508 |
| 6,511,090 B2 | * 1/2003 | Quanbeck et al. ....... 280/491.1 |
| 2002/0053783 A1 | * 5/2002 | Davis ...................... 280/507 |

* cited by examiner

Primary Examiner—Daniel G. DePumpo
(74) Attorney, Agent, or Firm—Leslie C. Hodges

(57) ABSTRACT

A trailer hitch assembly for a vehicle includes a generally tubular receiver configured for attachment to the vehicle, and having a central aperture formed by walls of the receiver. The receiver has a rearward end. A hitch member is slidably received within the central aperture and has an attachment portion configured for attachment to a trailer. The hitch member is movable between an extended position in which the attachment portion protrudes from the rearward end of the receiver for attachment to a trailer, and a retracted position in which the attachment portion is positioned inside the central aperture for storage.

19 Claims, 4 Drawing Sheets

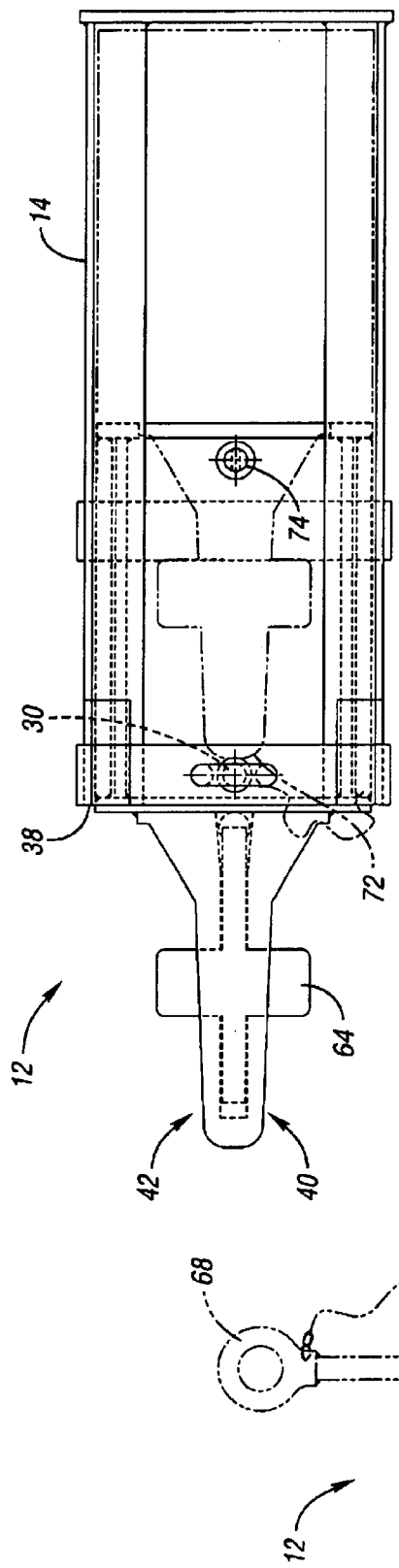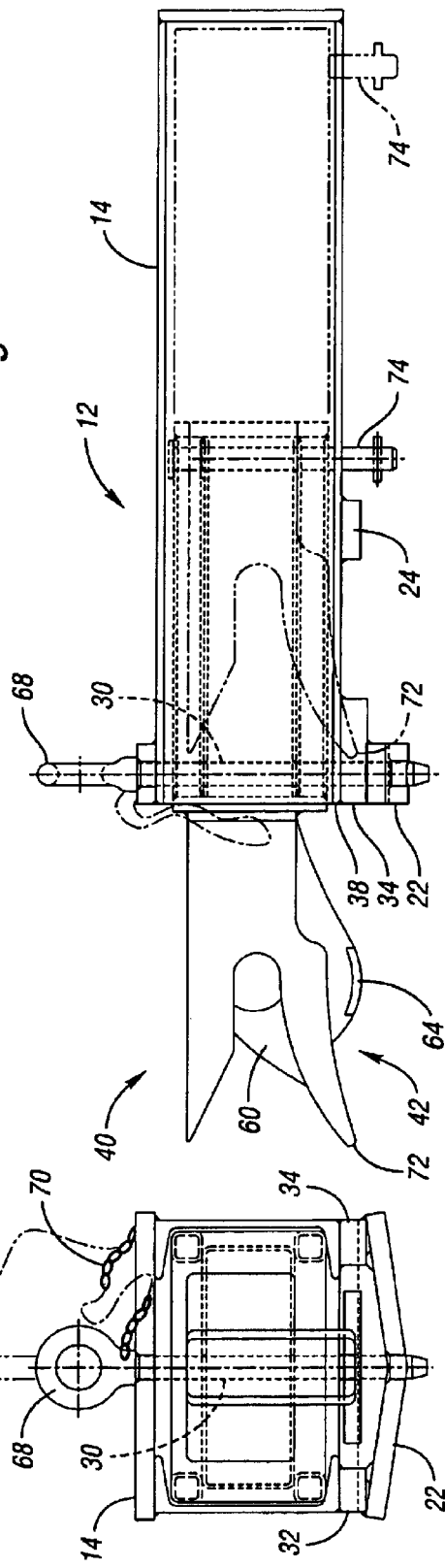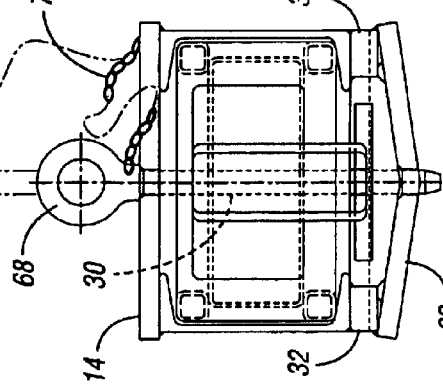

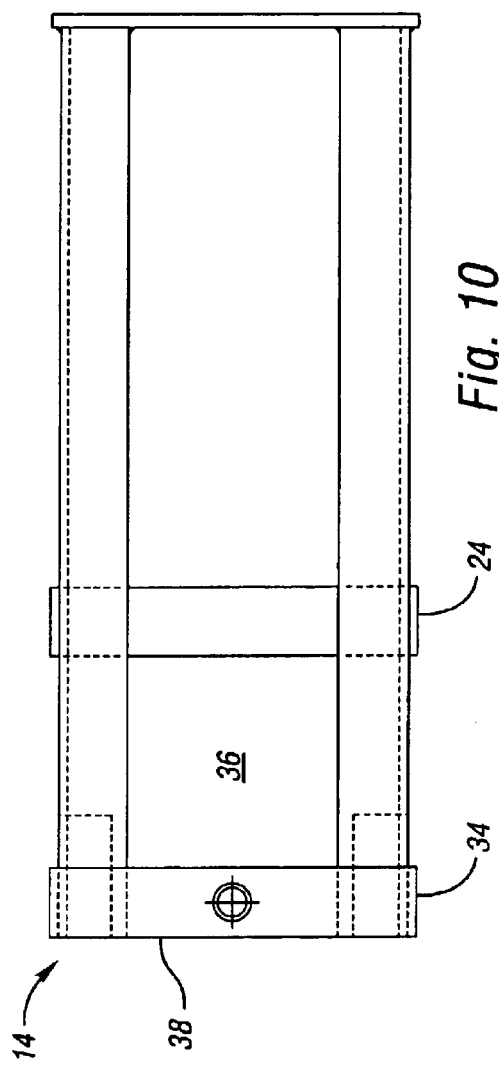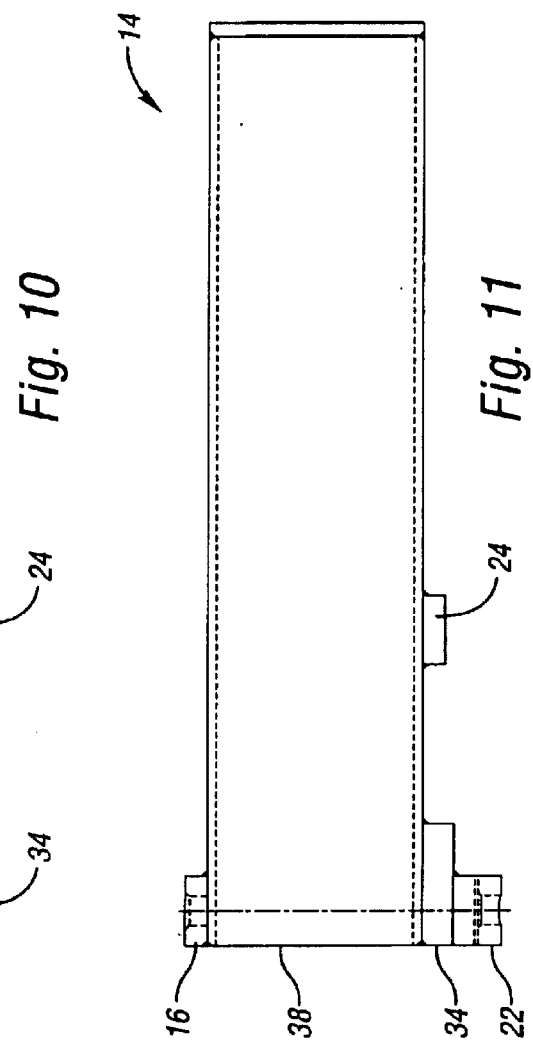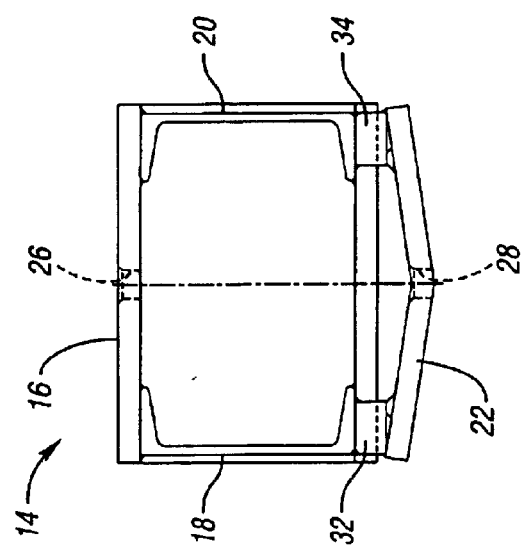

RETRACTABLE HITCH

TECHNICAL FIELD

The present invention relates to a retractable hitch for a vehicle which includes a hitch member movable with respect to a generally tubular receiver between an extended position for towing and a retracted position inside the receiver for out-of-the-way storage.

BACKGROUND OF THE INVENTION

Conventional trailer hitch assemblies used in towing industrial trailers, such as tool caddies, part bins, or recycling containers, or used in towing recreational trailers such as campers, boat trailers, etc., generally include a hitch ball or coupler that is fixed to the rearward end of the towing vehicle for engagement to a hitch coupler or bail attached to a forward end of a tongue assembly extending from a trailer.

It may be desirable to store the trailer hitch in an out-of-the-way location when not in use. The prior art includes retractable hitches, such as those described in U.S. Pat. Nos. 4,482,167 and 5,860,671.

SUMMARY OF THE INVENTION

The present invention provides a retractable hitch which is movable between extended and retracted positions with respect to a towing vehicle. The hitch is specifically designed for use on industrial shop vehicles or shop mules, but also may be applicable to other industrial or recreational trailer hitch or coupler devices.

The hitch or coupler is attached to steel tubing and mounted in a steel cage or receiver that is welded to the bottom of a towing vehicle. The hitch may be extended and pinned into place for use, and pushed back under the vehicle and pinned into place when not in use.

More specifically, the invention provides a trailer hitch assembly including a generally tubular receiver, configured for attachment to a vehicle, and having a central aperture formed by walls of the receiver, and having a rearward end. The hitch member is slidably received within the central aperture and has an attachment portion configured for attachment to a trailer. The hitch member is movable between an extended position in which the attachment portion protrudes from the rearward end of the receiver for attachment to a trailer, and a retracted position in which the attachment portion is positioned inside the central aperture for storage.

A retention pin is configured to selectively engage first and second apertures formed through the receiver and a retention aperture formed in the hitch member. The retention pin retains the hitch member in the extended position when the retention pin engages the retention aperture and the first and second apertures. The retention pin may also be positioned extending through the first and second apertures when the hitch member is in the retracted position to obstruct the rearward end of the central aperture to prevent the attachment portion of the hitch assembly from protruding through the rearward end of the central aperture.

A chain is provided to connect the retention pin to the receiver. A second pin is connected to the hitch member and is abuttable against a stop member on the receiver to limit the extent of rearward travel of the hitch member with respect to the receiver. The receiver includes a top bar, side walls and first and second bottom bars. The first aperture is formed in the top bar and the second aperture is formed in the first bottom bar. The first bottom bar is bent to facilitate removal of the hitch member and second pin from the receiver if desired.

The generally tubular receiver is substantially rectangular in vertical cross-section, and the receiver and hitch member preferably are steel components.

The attachment portion may be a trailer hitch or coupler, and preferably includes a pivotably movable hook member movable with respect to a V-shaped opening.

The above objects, features, and advantages and other objects, features and advantages of the present invention are readily apparent from the following detailed description of the best mode for carrying out the invention when taken in connection with the accompanying drawings.

BRIEF DESCRIPTION OF THE DRAWINGS

FIG. 3 shows a front-end view of the trailer hitch assembly shown in FIG. 1;

FIG. 4 shows a side view of the trailer hitch assembly of FIG. 1, with the retracted position shown in phantom;

FIG. 5 shows a top plan view of the trailer hitch assembly of FIG. 1, with the retracted position shown in phantom;

FIG. 9 shows an end view of the receiver shown in FIG. 1;

FIG. 10 shows a top plan view of the receiver shown in FIG. 9; and

FIG. 11 shows a side view of the receiver shown in FIG. 9.

DESCRIPTION OF THE PREFERRED EMBODIMENT

Figure 1:
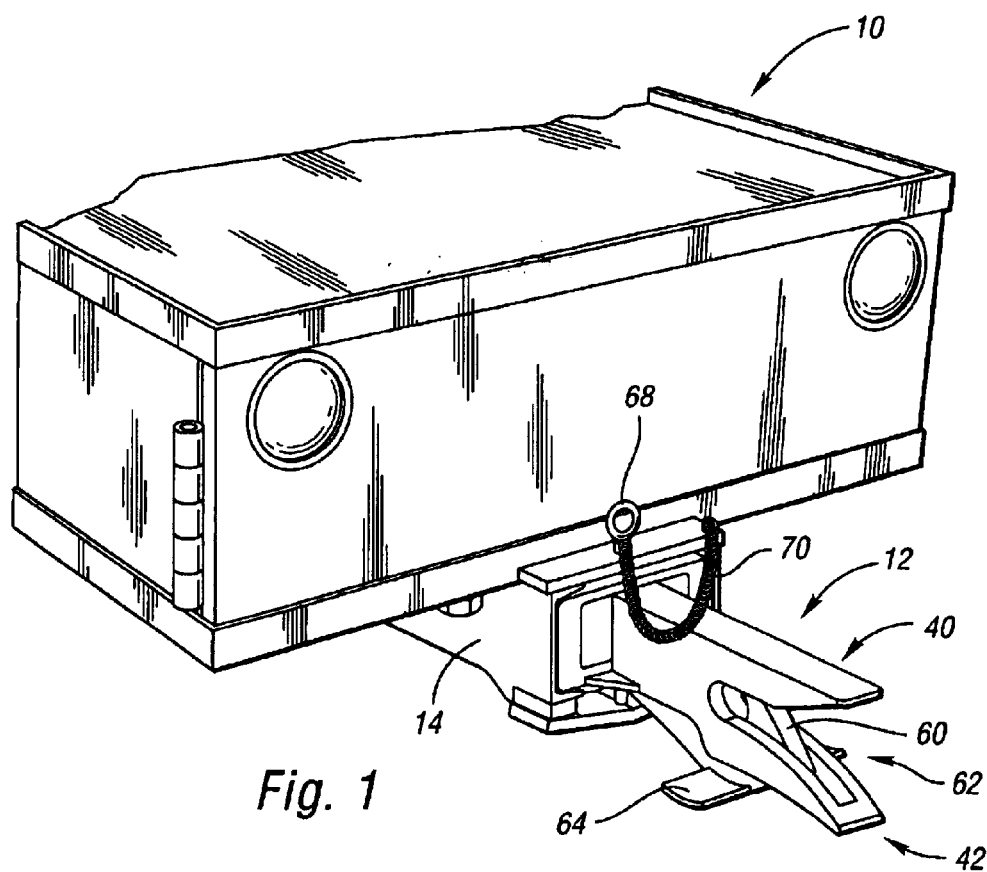
FIG. 1 shows a perspective view of a towing vehicle including a trailer hitch in the extended position.
Figure 2:
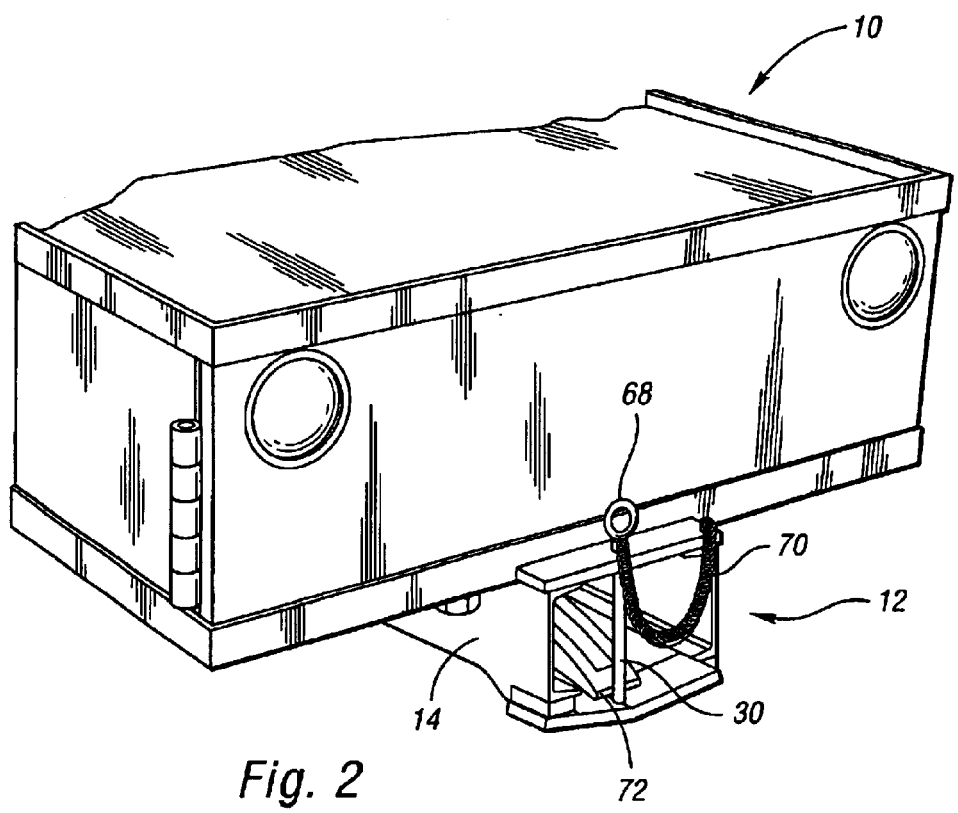
FIG. 2 shows a perspective view of the vehicle of FIG. 1 with the trailer hitch in the retracted position.
Figure 8:
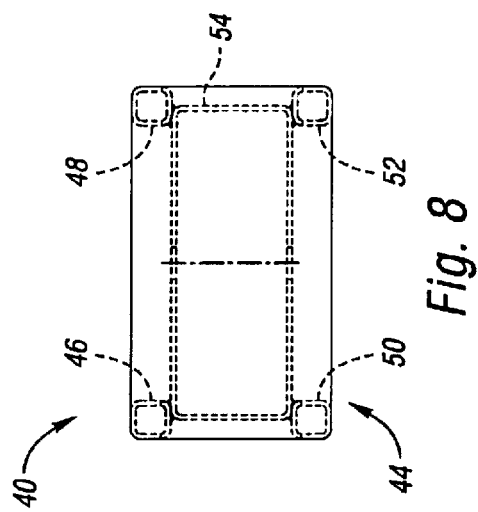
FIG. 8 shows a rear-end view of the hitch member of FIG. 6.

FIGS. 1 and 2 show perspective views of an industrial towing vehicle 10 having a retractable trailer hitch 12 mounted at an underside of the towing vehicle 10. FIG. 1 shows the retractable trailer bitch 12 in the extended position, and FIG. 2 shows the retractable trailer hitch in the retracted position.

FIGS. 3–5 show various views of the retractable trailer hitch 12 in the extended position, with the retracted position shown in phantom. As shown, the trailer hitch assembly 12 includes a generally tubular receiver 14 which is configured for mounting, such as welding, to the towing vehicle. The receiver 14 is shown in greater detail in FIGS. 6–11. The receiver includes a top bar 16, side walls 18, 20, and first and second bottom bars 22, 24. These components cooperate to form a generally tubular receiver or cage structure.

As shown in FIG. 9, the top bar 16 includes a first aperture 26 formed therethrough, and the first bottom bar 22 is bent, and includes a second aperture 28 formed therethrough. The first and second apertures 26, 28 are configured to slidably receive the retention pin 30, shown in FIG. 3. As further shown in FIG. 9, the first bottom bar 22 is supported by first and second rails 32, 34.

The generally tubular receiver 14 forms a central aperture 36, and has a rearward end 38.

The trailer hitch assembly 12 further includes a hitch member 40 which is slidably received within the central aperture 36 of the receiver 14. The hitch member 40 is shown in greatest detail in FIGS. 6–8. The hitch member 40 includes an attachment portion 42 which is mounted to a support structure 44, which is slidably received within the central aperture 36 of the receiver 14. The support structure 44 includes four square tubes 46, 48, 50, 52 which are supported by a larger rectangular tube 54. End plates 56, 58 are welded to the tubes 46, 48, 50, 52, 54, 56, and the attachment portion 42 is welded to the end plate 56.

In the preferred embodiment, the attachment portion 42 is a coupler hitch configured for attachment to a bail. Such coupler hitches are available from Hamilton Casters & Manufacturing Co. of Hamilton, Ohio, under product identifier "AJ-H coupler". As shown, the attachment portion 42 includes a pivotally movable hook member 60 which is movable (and spring-loaded) with respect to a V-shaped opening 62. The hook member 60 has an angled lead surface 64 to facilitate automatic engagement as the towing vehicle is backed toward and engages against the bail of a trailer. The hook member 60 also includes a foot pad 64 which acts as a lever to enable a user to step on and press down the foot pad to disengage the hook member 60. Of course, the present invention is not limited to the coupler shown and described herein. The invention is applicable to any type of trailer hitch or coupler assembly, such as a hitch ball, etc.

The support structure 44 of the hitch member 40 is slidably received within the central aperture 36 of the receiver 14 to facilitate movement between the extended and retracted positions.

As shown in FIGS. 4 and 5, in the extended position, the attachment portion 42 protrudes from the rearward end 38 of the receiver 14 for attachment to a trailer. As shown in phantom in FIGS. 4 and 5, in the retracted position, the attachment portion 42 of the hitch member 40 is positioned completely inside the central aperture 36 for out-of-the-way storage.

Figure 6:
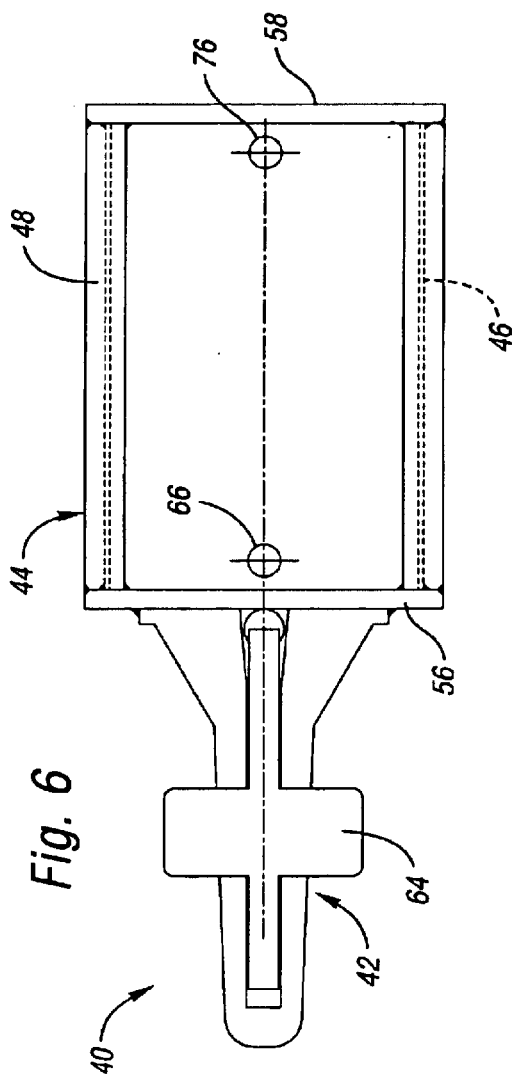
FIG. 6 shows a bottom plan view of the hitch member shown in FIG. 1.
Figure 7:
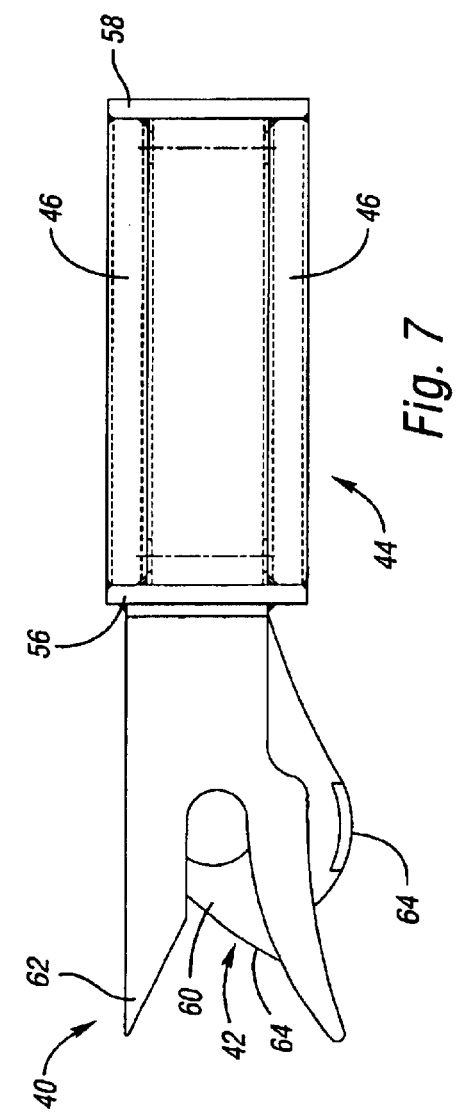
FIG. 7 shows a side view of the hitch member of FIG. 6.

The retention pin 30 selectively engages the first and second apertures 26, 28, shown in FIG. 9, and a retention aperture 66 in the rectangular tube 54 of the support structure 44 of the hitch member 40, shown in FIG. 6, to retain the hitch member 40 in the extended position, as shown in FIGS. 4 and 5.

As shown in FIG. 3, the retention pin 30 has a handle portion 68 to facilitate removal of the pin 30 from the apertures 26, 28, 66. The retention pin 30 also includes a chain 70 which secures the retention pin 30 to the receiver 14.

The retention pin 30 is also operative to abut the distal end 72 of the attachment portion 42 when the attachment portion 42 is in the retracted position, shown in phantom in FIGS. 4 and 5, to obstruct the rearward end 38 of the central aperture 36 to prevent the attachment portion 42 from protruding through the rearward end 38 of the central aperture 36.

The assembly further includes a second pin 74, shown in FIGS. 4 and 5, which extends through the aperture 76 of the rectangular tube 54, shown in FIG. 6. The second pin 74 is, accordingly, connected to the hitch member 40 and abuttable against the second bottom bar (or stop member) 24 on the receiver 14 to limit the extent of rearward travel of the hitch member 40 with respect to the receiver 14.

In order to remove the hitch member 40 from the receiver 14, the retention pin 30 is removed from the apertures 26, 28, and the hitch member 40 is slid out of the receiver. As shown in FIG. 3, the first bottom bar 22 is bent downward to provide clearance so that the second pin 74 may slide past the first bottom bar 22 by simply displacing the second pin 74 slightly upward to provide clearance as the hitch member 40 is removed from the receiver 14.

All components shown in the various Figures are preferably steel components which are welded together. To provide high strength, the components are preferably SAE 1020 steel or SAE A36 steel.

While the best mode for carrying out the invention has been described in detail, those familiar with art to which this invention relates will recognize various alternative designs and embodiments for practicing the invention within the scope of the appended claims.

What is claimed is:

1. A trailer hitch assembly for a vehicle comprising:
a generally tubular receiver configured for attachment to the vehicle, having a central aperture formed by walls of the receiver and having a rearward end;
a hitch member slidably received within the central aperture and having an attachment portion configured for attachment to a trailer, said hitch member being movable between an extended position in which the attachment portion protrudes from the rearward end of the receiver for attachment to a trailer, and a reacted position in which the attachment portion is positioned inside the central aperture for storage; and
a retention pin configured to selective engage first and second apertures in the receiver and a retention aperture in the hitch member, wherein the retention pin retains the hitch member in the extended position when the retention pin engages the retention aperture and the first and second apertures, said retention pin including a portion protruding outside the receiver to facilitate removal of the retention pin.

2. The tailer hitch assembly of claim 1, wherein the retention pin may be positioned extending through the first and second apertures where the hitch member is in the retracted position to obstruct the rearward end of the central aperture to prevent the attachment portion from protruding through the rearward end of the central aperture.

3. The trailer hitch assembly of claim 1, further comprising a chain connecting the retention pin to the receiver.

4. The trailer hitch assembly of claim 2, wherein the attachment portion includes a pivotally movable hook member movable with respect to a V-shaped opening.

5. The trailer hitch assembly of claim 1, further comprising a second pin connected to the hitch member and abuttable against a stop member on the receiver to limit the extent of rearward travel of the hitch member with respect to the receiver.

6. The trailer hitch assembly of claim 5, wherein the receiver includes a top bar, side walls and first and second bottom bars, and wherein the first aperture is formed in the top bar and the second aperture is formed in the first bottom bar.

7. The trailer hitch assembly of claim 1, wherein the generally tubular receiver is substantially rectangular in vertical cross-section.

8. The trailer hitch assembly of claim 1, wherein the receiver and hitch member comprise steel components.

9. A trailer hitch assembly for a vehicle comprising:
a generally tubular receiver configured for attachment to the vehicle, having a central aperture formed by walls of the receiver and having a rearward end;
a hitch member slidably received within the central aperture and having an attachment portion configured for attachment to a trailer, said hitch member being movable between an extended position in which the attachment portion protrudes from the rearward end of the receiver for attachment to a trailer, and a retracted position in which the attachment portion is positioned inside the central aperture for storage;

a retention pin configured to selectively engage first and second apertures in the receiver and a retention aperture in the hitch member, wherein the retention pin retains the hitch member in the extended position when the retention pin engages the retention aperture and the first and second apertures;

wherein the retention pin may be positioned extending through the first and second apertures when the hitch member is in the retracted position to obstruct the rearward end of the central aperture to prevent the attachment portion from protruding through the rearward end of the central aperture.

10. The trailer hitch assembly of claim 9, further comprising a chain connecting the retention pin to the receiver.

11. The trailer hitch assembly of claim 9, wherein the attachment portion includes a pivotally movable hook member movable with respect to a V-shaped opening.

12. The trailer hitch assembly of claim 9, further comprising a second pin connected to the hitch member and abuttable against a stop member on the receiver to limit the extent of rearward travel of the hitch member with respect to the receiver.

13. The trailer hitch assembly of claim 12, wherein the receiver includes a top bar, side walls and first and second bottom bars, and wherein the first aperture is formed in the top bar and the second aperture is formed in the first bottom bar.

14. The trailer hitch assembly of claim 9, wherein the generally tubular receiver is substantially rectangular in vertical cross-section.

15. The bailer hitch assembly of claim 9, wherein the receiver and hitch member comprise steel components.

16. A trailer hitch assembly for a vehicle comprising:

a receiver configured for attachment to the vehicle, having a central aperture formed by walls of the receiver;

a hitch member slidably received within the central aperture and having an attachment end configured for attachment to a trailer, said hitch member being movable between an extended position in which the attachment portion protrudes from the receiver for attachment to a trailer, and a retracted position in which the attachment portion is positioned entirely inside the central aperture for storage; and a retention pin removably positionable across a rearward end of the receiver to abut the attachment end of the hitch member to secure the bitch member in the retracted position and also positionable to penetrate the hitch member to secure the hitch member in the extended position.

17. The trailer hitch assembly of claim 16, further comprising a chain connecting the retention pin to the receiver.

18. The trailer hitch assembly of claim 16, wherein the attachment portion includes a pivotally movable hook member movable with respect to a V-shaped opening.

19. The trailer hitch assembly of claim 16, further comprising a second pin connected to the hitch member and abuttable against a stop member on the receiver to limit the extent of rearward travel of the hitch member with respect to the receiver.

* * * * *